(12) United States Patent
Kim et al.

(10) Patent No.: US 8,934,740 B2
(45) Date of Patent: Jan. 13, 2015

(54) FIBER OPTIC SENSOR USING TRANSMISSIVE GRATING PANEL AND MIRROR

(75) Inventors: Chun-Gon Kim, Yusong-gu (KR);
Yeon-Gwan Lee, Yusong-gu (KR);
Byeong-Wook Jang, Yusong-gu (KR);
Jin-Hyuk Kim, Yusong-gu (KR);
Yoon-Young Kim, Yusong-gu (KR)

(73) Assignee: Korea Advanced Institute of Science and Technology (KAIST) (KR)

( * ) Notice: Subject to any disclaimer, the term of this patent is extended or adjusted under 35 U.S.C. 154(b) by 429 days.

(21) Appl. No.: 13/470,511

(22) Filed: May 14, 2012

(65) Prior Publication Data
US 2013/0016940 A1    Jan. 17, 2013

(30) Foreign Application Priority Data

May 12, 2011   (KR) .................. 10-2011-0044511
Aug. 11, 2011   (KR) .................. 10-2011-0080127

(51) Int. Cl.
| G02B 6/00 | (2006.01) |
| G01L 9/00 | (2006.01) |
| G01P 15/093 | (2006.01) |
| G01K 11/32 | (2006.01) |
| G01H 9/00 | (2006.01) |
| G01L 1/24 | (2006.01) |

(52) U.S. Cl.
CPC ............. *G01L 9/0007* (2013.01); *G01P 15/093* (2013.01); *G01K 11/32* (2013.01); *G01L 9/0077* (2013.01); *G01H 9/006* (2013.01); *G01L 1/24* (2013.01)
USPC .......................................................... 385/12

(58) Field of Classification Search
USPC .......................................................... 385/12
See application file for complete search history.

(56) References Cited

U.S. PATENT DOCUMENTS

| 3,344,700 A | * | 10/1967 | Brake | ............................. 356/616 |
| 4,293,188 A | * | 10/1981 | McMahon | ....................... 385/13 |
| 4,596,925 A | * | 6/1986 | Gilby | ........................ 250/227.21 |

* cited by examiner

*Primary Examiner* — Uyen Chau N Le
*Assistant Examiner* — John M Bedtelyon
(74) *Attorney, Agent, or Firm* — Kevin D. Jablonski; Lane Powell PC

(57) ABSTRACT

Disclosed herein is a fiber optic sensor using a transmissive grating panel and a mirror, in which displacement resulting from a temperature change in the external environment or a behavioral change in an object to be measured is measured using a transmissive grating panel, a reflection mirror and an optical fiber, and then enables various measurements to be taken of the temperature change in the external environment and the behavioral change (displacement, pressure, vibration or acceleration, etc.) in the object on the basis of the measured displacement.

24 Claims, 9 Drawing Sheets

FIBER OPTIC SENSOR USING TRANSMISSIVE GRATING PANEL AND MIRROR

PRIORITY CLAIM

The present application claims the benefit of the Korean Patent Application Serial Nos. KR10-2011-0044511 filed on May 12, 2011, and KR-10-2011-0080127 filed on Aug. 11, 2011; all the foregoing applications are incorporated herein by reference in their entireties.

BACKGROUND OF THE INVENTION

1. Field of the Invention

The present invention relates generally to fiber optic sensors and, more particularly, to a fiber optic sensor using a transmissive grating panel and a mirror, in which displacement resulting from a temperature change in the external environment or a behavioral change in an object to be measured is measured using a grating panel, a reflection mirror and an optical fiber, and then enables various measurements to be taken of the temperature change in the external environment and the behavioral change (displacement, pressure, vibration or acceleration, etc.) in the object on the basis of the measured displacement.

2. Description of the Related Art

Large structures, such as bridges, large buildings or power generating equipment, are very complicated, thus leading to accidents stemming from various causes. These accidents may result in enormous losses of life and property, and may cause great inconvenience in an industrial setting and in daily life. Hence, in order to maintain the safety of such large structures, it should be regularly checked whether repair or maintenance should be performed to prevent a disaster.

However, in the case of a poor electromagnetic environment, for example, a power plant or a railroad track, a great number of sensors are required and the length of electric wire for connecting the sensors to each other is considerably long, so that signal noise is serious when electromagnetic waves are not blocked. Thus, using a conventional electronic-based sensor is problematic.

Fiber optic sensors are also a sensing system used in smart structures. Since such a fiber optic sensor performs measurement using light it is operated without electromagnetic wave interference. Thus, the fiber optic sensor may be utilized even in an environment in which there are electromagnetic waves or during the operation of the structure. Further, the fiber optic sensor is highly sensitive and can measure defects in real time. Further, the fiber optic sensor is small in size and light in weight, so that when it is applied to a structure, the weight concentration effect is low, and in addition the fiber optic sensor is very small in diameter and is flexible, thus allowing a fiber optic sensor to be manufactured in a desired size. Furthermore, advantageously, the fiber optic sensor is resistant to environmental influences, such as corrosion, directed against the lifespan of the sensor, can be used over a wide range of operating temperatures due to excellent temperature characteristics, and can obtain information even over long distances, thus enabling monitoring without concern about the loss of life or experimental equipment even in dangerous environments.

Because of these advantages, extensive research into measuring physical quantities using the fiber optic sensor have been conducted until now. Further, extensive research is being conducted into using the fiber optic sensor as a sensor for monitoring the safety of a structure. However, as for an extrinsic fabry-perot interferometric (EFPI) sensor, the sensor utilizes an interference signal, so that a very small gap should be formed using a microscope, and it is complicated to process a signal because the interference signal is not in the form of a sine wave. Further, as for a fiber Bragg grating (FBG) sensor, a great deal of cost is required to construct a system and thus the sensor is not economical.

Conventionally, there is technology for measuring displacement, strain, acceleration, or the like using a grating pattern. This technology utilizes moire fringe that occurs when two grating patterns overlap each other. Thus, this technology requires two grating panels. Further, since this technology measures displacement, strain, acceleration, or the like using a transmission signal, two optical fibers serving as a light emitting part and a light receiving part should be provided in pairs. Hence, in the case of fabricating a sensor, optical fiber lines are extended to both sides, so that its structure becomes undesirably complicated.

Therefore, there is urgently needed research and development into a simple, economical and efficient sensor capable of being applied to a wide range of fields, for example, civil structures, building structures, power plants or railroad tracks which have a poor electromagnetic environment.

SUMMARY OF THE INVENTION

Accordingly, the present invention has been made keeping in mind the above problems occurring in the prior art, and an object of the present invention is to provide a fiber optic sensor using a transmissive grating panel and a mirror, which measures displacement resulting from a temperature change in the external environment or a behavioral change in an object using a transmissive grating panel having transmissive surfaces and non-transmissive surfaces at predetermined pitches, a reflection mirror for reflecting light passing through the transmissive grating panel, and an optical fiber for receiving light reflected from the reflection mirror, and then enables various measurements to be taken of the temperature change in the external environment and the behavioral change (displacement, pressure, vibration or acceleration, etc.) in the object on the basis of the measured displacement.

Another object of the present invention is to provide a fiber optic sensor using a transmissive grating panel and a mirror, which utilizes one strand of optical fiber that is not affected by electromagnetic wave interference and one transmissive grating panel, thus being usable in a wide range of fields, such as civil structures or building structures, power plants or railroad tracks where the electromagnetic environment is poor, at low cost.

In order to accomplish the above objects, the present invention provides a fiber optic sensor using a transmissive grating panel and a mirror, including a fixing member; response means secured at one side thereof to the fixing member to change displacement in response to a temperature change in an external environment or a behavioral change in an object that is to be measured; a transmissive grating panel provided on an end of the response means, and including transmissive surfaces and non-transmissive surfaces arranged at predetermined pitches in a grating pattern, each of the transmissive surfaces being made of a transmissive material to form a transmissive area, each of the non-transmissive surfaces being made of a non-transmissive material that is relatively lower in transmissivity than the transmissive surface to form a non-transmissive area; a reflection mirror secured to the fixing member in such a way as to be positioned on one side of the transmissive grating panel; and a pair of optical fibers positioned on the other side of the transmissive grating panel facing the reflection mirror, and secured to the fixing member in such a way that an end of each of the optical fibers is perpendicular to a surface of the transmissive grating panel, the optical fibers being provided, respectively, at predetermined positions and serving as a light irradiating part to irradiate light to the transmissive grating panel and a light receiving part to receive reflective light passing through the transmissive grating panel and subsequently reflected from the reflection mirror, wherein the transmissive grating panel, the reflection mirror and the pair of optical fibers are provided to be spaced apart at distances at which a signal of a sine wave is output, and the pair of optical fibers is provided at positions having a phase of 90° (π/2) relative to the sine wave.

The response means may comprise a pair of bimetal members, the bimetal members being secured at one end thereof to the fixing member in a form of a cantilever beam in such a way as to be spaced apart from each other by a predetermined interval and being connected at the other end to the transmissive grating panel, or the response means may comprise a bimetal member made of a spiral bimetal material, the bimetal member being secured at one end thereof to the fixing member and secured at the other end to the transmissive grating panel.

The response means may comprise a connection member, the connection member being secured at one end thereof to the fixing member and secured at the other end to the transmissive grating panel.

The response means may include a single attenuator secured to the fixing member, a single elastomer provided above the single attenuator, and a single mass secured at one side thereof to a top of the single elastomer and secured at another side thereof to the transmissive grating panel.

The response means may include a guide bar secured to the fixing member in such a way as to be erected vertically, an elastomer secured to the fixing member in such a way as to be erected vertically, the elastomer being provided on a side of the guide bar, with the transmissive grating panel being secured to a top of the elastomer, and a pressure applying plate provided on a top of the transmissive grating panel to apply external pressure to the transmissive grating panel.

A width of each of the transmissive surfaces and a width of each of the non-transmissive surfaces may be equal to or smaller than a diameter of an optical beam irradiated from the optical fiber. The non-transmissive surfaces may be made of a reflective material or an absorptive material.

A collimator may be further mounted to an end of each of the optical fibers to make collimated light and thus increase a quantity of light transmitted to the optical fiber.

This invention can advantageously provide a sensor, which performs measurement using a transmissive grating panel having transmissive surfaces and non-transmissive surfaces at predetermined pitches, a reflection mirror for reflecting light passing through the transmissive grating panel, and an optical fiber for receiving light reflected from the reflection mirror, and then enables various measurements to be taken of a temperature change in the external environment and a behavioral change (displacement, pressure, vibration or acceleration, etc.) in an object on the basis of the measured displacement.

Further, this invention can advantageously provide a sensor, which utilizes one strand of optical fiber that is not affected by electromagnetic wave interference, one transmissive grating panel and a reflection mirror, thus being usable in a wide range of fields, such as civil structures or building structures, power plants or railroad tracks where an electromagnetic environment is poor, at low cost.

Furthermore, this invention has an advantage in that the temperature variation of the external environment or the behavioral variation of an object is measured using only a mechanical mechanism and an optical signal thereof, so that it can measure temperature without external electromagnetic waves and noise.

Further, this invention is configured so that a stationary reflection mirror serves as a reflection surface and a transmissive grating panel serves as a transmissive surface, thus allowing a transmissive grating panel having a non-transmissive surface or an absorption surface to be utilized, and a displacement quantity of response means is increased depending on a temperature change or a behavioral change, thus allowing reflection to be performed via the stationary reflection mirror even if the transmissive grating panel is distorted, and thereby enabling the precise measurement of the temperature, displacement, pressure, vibration, or acceleration. That is, it is basically possible to use a connection portion or a guide bar especially invented to prevent an angle of the transmissive grating panel from being distorted when the transmissive grating panel moves. Nevertheless, the quantity of received light may be greatly affected by the distortion due to tolerance. However, according to the invention, reflection is performed using the stationary reflection mirror, and the quantity of light received after being reflected from the mirror is used, thus achieving precise temperature measurement.

Furthermore, this invention enables the mass production of a transmissive grating panel using an MEMS process, and can form an optical system with a laser source and a photo detector, thus achieving a cost reduction effect and enhancing the applicability of a practical structure.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF PREFERRED EMBODIMENTS

Figure 1:
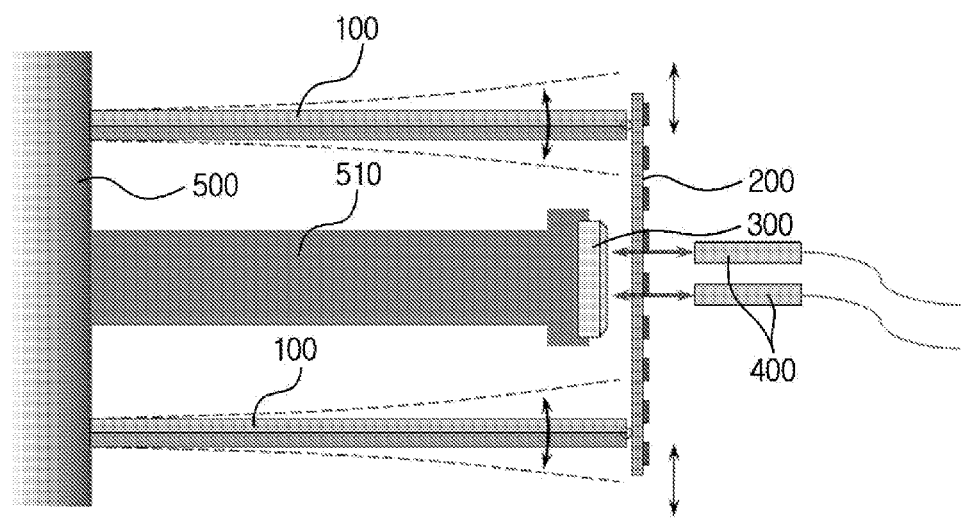
FIG. 1 is a schematic view illustrating a configuration of a fiber optic sensor for measuring the temperature using a transmissive grating panel and a mirror, in accordance with an embodiment of the present invention.

A fiber optic sensor using a transmissive grating panel and a mirror according to the present invention is configured so that displacement resulting from a temperature change in an external environment or a behavioral change in an object is measured using the transmissive grating panel, the reflection mirror and an optical fiber, and then enables various measurements to be taken of the temperature change in the external environment or the behavioral change (displacement, pressure, vibration, acceleration, etc.) in the object based on the measured displacement. Here, the temperature change in the external environment or the behavioral change in the object is responded at response means to transmit a displacement quantity thereof to the transmissive grating panel.

Hereinafter, the technical characteristics of this invention will be described in detail with reference to a fiber optic sensor for measuring the temperature using the transmissive grating panel and the mirror as one example.

The fiber optic sensor for measuring the temperature using the transmissive grating panel and the mirror according to this invention is configured so that displacement generated in a bimetal member 100 resulting from the temperature change is measured using a transmissive grating panel 200, a reflection mirror 300 and optical fibers 400 and then a calculation is performed to measure the temperature. In this context, the bimetal member 100 serves as response means, which responds to the temperature change in the external environment and transmits its displacement quantity to the transmissive grating panel 200.

According to this invention, the bimetal member 100 is installed in the form of a cantilever beam. However, if there occurs the temperature change with the bimetal member 100 installed in the form of the cantilever beam, the bimetal member 100 is curved, thus resulting in the vertical displacement occurring at an end of the bimetal member 100. However, since the displacement quantity is not perfectly linear depending on the temperature and is relatively small, a general bimetal thermometer employs a bimetal member in the form of a spiral which is twisted several times instead of such a cantilever beam, to measure the magnitude of torsion. Therefore, this invention proposes a method of measuring the temperature by measuring the quantity of displacement generated in the cantilever beam or the spiral structure.

On one hand, there are several methods of measuring the displacement quantity. According to this invention, a method of measuring a displacement quantity merely uses optical fiber and an optical signal thereof, without using various electronic devices so as not to be affected by an electromagnetic wave. Particularly, in order to reduce the number of optical fibers which are used by as many as possible, one optical fiber or an optical fiber collimator must be configured to serve as both a light irradiating part and a light receiving part.

Here, in the simplest method, there may be a method of using a reflective grating panel and an optical signal reflected from the grating panel without a stationary mirror. However, if the grating panel is installed at an end of the cantilever-beam type of bimetal member, an angle of the grating panel is distorted as the bimetal member is bent, and thus light reflected from the reflective grating panel may not be incident on the light receiving part. In order to avoid it, there may be installed a guide which allows the movement of only one degree of freedom when the grating panel moves. However, this guide inevitably leads to mechanical tolerance, so that it cannot become a fundamental solution.

Accordingly, this invention proposes a configuration wherein the stationary reflection mirror 300 is applied in relation to the optical fibers 400 to measure displacement without being affected by the distortion of such a grating panel, thus solving the above problem.

Hereinbelow, preferred embodiments of a fiber optic sensor for measuring the temperature using a transmissive grating panel and a mirror according to the present invention will be described in detail with reference to the accompanying drawings.

FIG. 1 is a schematic view illustrating a configuration of a fiber optic sensor for measuring the temperature using a transmissive grating panel and a mirror, in accordance with an embodiment of the present invention.

As shown in FIG. 1, the fiber optic sensor for measuring the temperature using the transmissive grating panel and the mirror in accordance with this embodiment is configured to measure displacement of a bimetal member 100 resulting from the temperature change using a transmissive grating panel 200, a reflection mirror 300, and optical fibers 400, and subsequently provides the measured displacement to a system, thus enabling the temperature to be measured by the system. The transmissive grating panel 200 has transmissive and non-transmissive surfaces at predetermined pitches. The reflection mirror 300 reflects light passing through the transmissive grating panel. The optical fiber 400 receives light reflected from the reflection mirror 300.

First, the basic principle behind the fiber optic sensor for measuring the temperature and the system having this sensor according to this embodiment will be described.

When the bimetal member 100 is installed in the form of a cantilever beam and undergoes the temperature change, the end of the bimetal member 100 is bent in one direction (a direction of the metal having a small thermal expansive constant) due to a difference in thermal expansive coefficient between two metals. As a result, displacement δ occurs at the end of the bimetal member 100.

Figure 2:
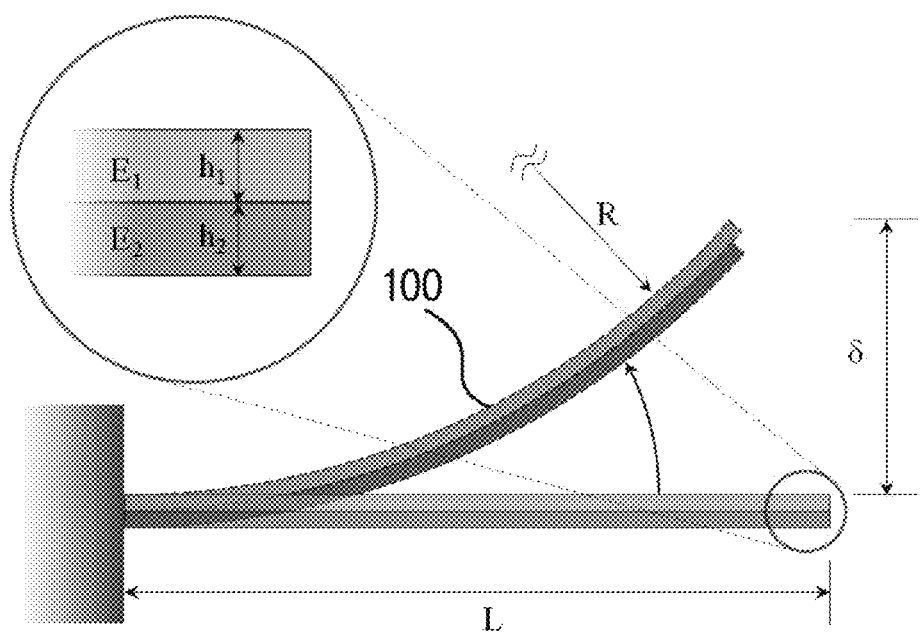
FIG. 2 is a view illustrating a curvature change in a cantilever-beam type of bimetal member shown in FIG. 1 resulting from the temperature change and displacement resulting from the curvature change.

FIG. 2 is a view illustrating a curvature change in the cantilever-beam type of bimetal member shown in FIG. 1 resulting from the temperature change and the displacement resulting from the curvature change. If the displacement δ generated by the curvature change in the bimetal member of FIG. 2 is expressed as an equation, the following equation 1 is obtained.

$$\delta = \frac{1}{\kappa}[1 - \cos(\kappa L)] \quad \text{(Eq. 1)}$$

where κ is a curvature $$\left(\kappa = \frac{1}{R}\right)$$

of the bimetal member 100, and the given curvature κ is calculated as the following equation 2 as described in Clyne, T W. "Residual stresses in surface coatings and their effects on interfacial debonding" (Key Engineering Materials (Switzerland) Vol. 116-117, pp. 307-330, 1996), assuming that Young's moduli of the two metals are represented as $E_1$ and $E_2$ and heights thereof are represented as $h_1$ and $h_2$.

$$\kappa = \frac{6E_1E_2(h_1+h_2)h_1h_2\varepsilon}{E_1^2h_1^4 + 4E_1E_2h_1^3h_2 + 6E_1E_2h_1^2h_2^2 + 4E_1E_2h_2^3h_1 + E_2^2h_2^4} \quad \text{(Eq. 2)}$$

where ε is a difference of strain caused by the thermal expansive coefficient of different metals, and is expressed as the following equation 3 when the thermal expansive coefficients of the metals are represented as $\alpha_1$ and $\alpha_2$, respectively.

$$\epsilon=(\alpha_1-\alpha_2)\Delta T \tag{Eq. 3}$$

Consequently, the vertical displacement δ in relation to the given temperature change ΔT can be calculated from a series of the above equations. As one example using the principle, there is a bimetal member switch for turning on or off a boiler depending on a preset indoor temperature. This embodiment is configured so that the generated displacement δ is measured based on two optical fiber signals.

In this embodiment, the reflection mirror 300 serves as a reflection surface to vertically reflect light that has been irradiated from the optical fiber and to make the light strike the optical fiber again.

Meanwhile, the system including the fiber optic sensor for measuring the temperature of this embodiment is configured to use a signal processing technology that calculates a moving distance of the grating panel by measuring the quantity of light that is incident on two optical fibers. This signal processing technology is a technology that is already used in sensor systems configured to measure displacement using the moire fringe technique [Dae Hyun K I M, "Geometric moire fringe fiber optic accelerometer system for monitoring civil infrastructures", Journal of Sensor Science and Technology, Vol. 15, No. 1, pp. 40-46, 2006]. The operating principle of the sensor system will be described in brief as follows.

First, it is assumed that a grating panel or a moire interference signal having a predetermined period for given displacement is present. Here, when the interference signal is measured by an optical measurement instrument, it has the form of a sine wave, and always has constant maximum and minimum values for several periods. Meanwhile, optical fibers are secured at two different positions such that the phase difference between two signals becomes π/2. Such a configuration allows the phase state and the velocity of each signal to be calculated by combining two simultaneously entering optical signals with the maximum and minimum values of the known optical signal. Thus, this embodiment is configured to use the transmissive grating panel having a predetermined period and two optical fibers to utilize the above mentioned signal processing technology.

Figure 3:
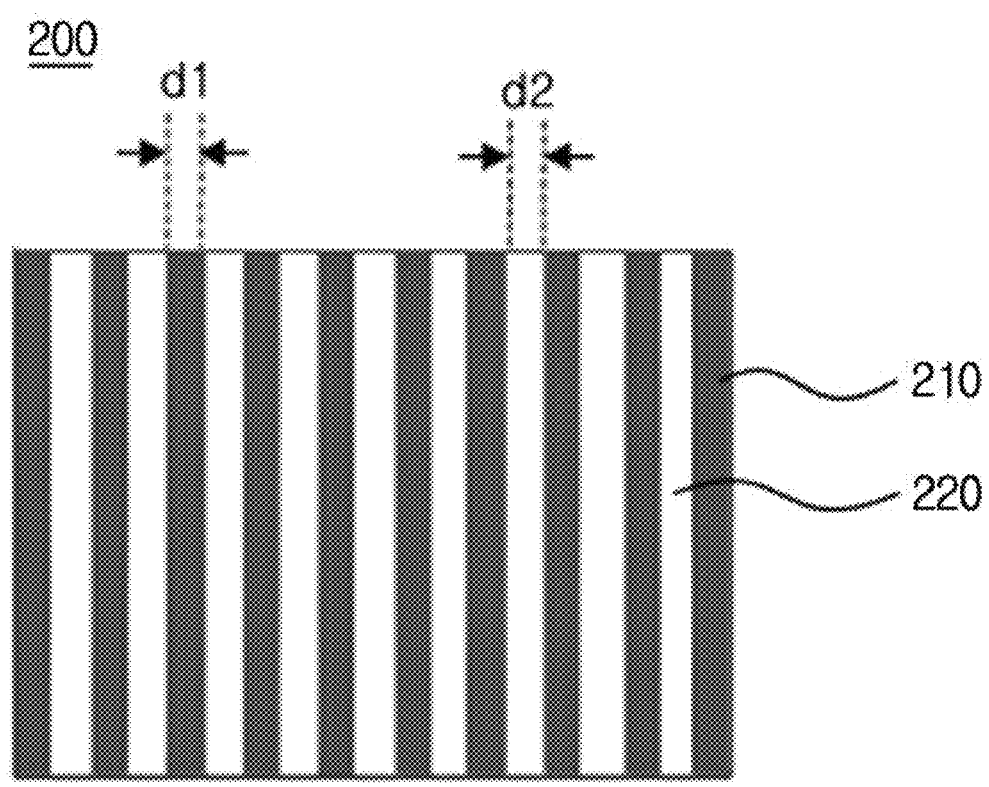
FIG. 3 is a view showing the configuration of the transmissive grating panel of FIG. 1.
Figure 4:
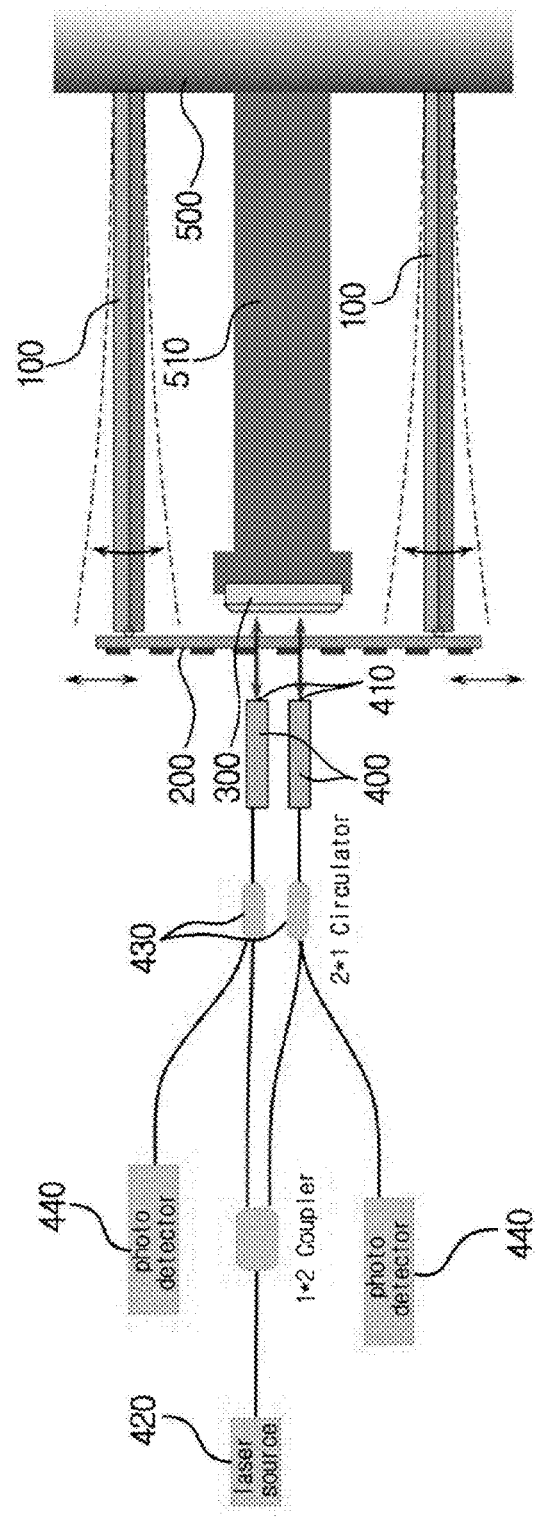
FIG. 4 is a view showing a configuration of a system including a fiber optic sensor for measuring the temperature of FIG. 1.
Figure 5A:
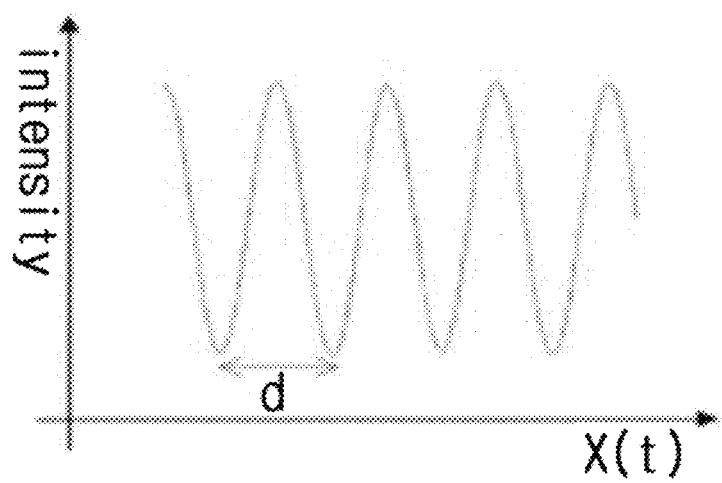
FIGS. 5A and 5B are graphs showing the form of signals that are attained through the system including the fiber optic sensor for measuring the temperature of FIG. 4.
Figure 5B:
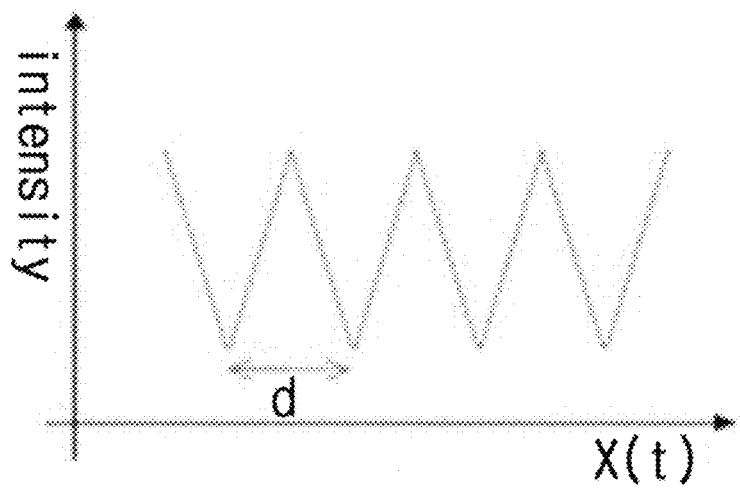

FIG. 3 is a view showing the configuration of the transmissive grating panel used in this embodiment, FIG. 4 is a view showing the configuration of the system including the fiber optic sensor for measuring the temperature of FIG. 2, and FIGS. 5A and 5B are graphs showing the form of a signal that is attained by the optical fiber via reflection when there occurs a displacement quantity of x(t) over time (t) in the system including the fiber optic sensor for measuring the temperature of FIG. 4.

As shown in FIG. 3, the transmissive grating panel 200 of this embodiment is in the form of a grating made by arranging transmissive surfaces 210 and non-transmissive surfaces 220 at predetermined pitches. Each transmissive surface 210 is made of a transmissive material to form a transmissive area. Each non-transmissive surface 220 is made of a non-transmissive material to form a non-transmissive area. Preferably, the transmissive surface 210 enables the complete transmission of light, while the non-transmissive surface 220 completely prevents the transmission of light. However, the non-transmissive surface 220 may be made of a non-transmissive material having a transmissivity that is very much lower than that of the transmissive surface 210 to form the non-transmissive area.

The transmissive grating panel 200 is formed in a rectangular shape by the transmissive surfaces 210 and the non-transmissive surfaces 220. That is, the transmissive grating panel 200 is configured so that the transmissive surfaces 210 and the non-transmissive surfaces 220 are repeatedly arranged at a predetermined pitch d. Here, the predetermined pitch d means the sum of a width d1 of the transmissive surface 210 and a width d2 of the non-transmissive surface 220. Further, the transmissive surface 210 and the non-transmissive surface 220 may be formed such that a boundary line between the transmissive surface 210 and the non-transmissive surface 220 is not a straight line but is a curve, as long as the quantity of transmitted light varies in the form of a sine wave as the light incident area changes. Further, a ratio of the width d1 of the transmissive surface 210 to the width d2 of the non-transmissive surface 220 may be changed, as long as the quantity of transmitted light varies in the form of a sine wave as the light incident area is changed.

As shown in FIGS. 2 to 4, the fiber optic sensor for measuring the temperature using the transmissive grating panel and the mirror according to this embodiment is configured so that light is irradiated onto the transmissive grating panel 200 that performs a linear movement with the optical fibers 400 being fixed, and thereafter the quantity of reflective light passing through the transmissive grating panel 200 and reflected from the reflection mirror 300 is received and utilized. The transmissive surfaces 210 and the non-transmissive surfaces 220 are arranged at the predetermined pitch in the linear moving direction of the transmissive grating panel 200. Further, the optical fibers 400 are arranged in a direction perpendicular to the surface of the transmissive grating panel 200. Thus, the transmissive grating panel 200 moves in a direction perpendicular to a vertical section 410 provided on an end of each optical fiber 400, and light irradiated through the vertical section 410 of each optical fiber 400 passes through the transmissive grating panel 200 and then is modulated as the sum of the quantity of light reflected from the reflection mirror 300 to be outputted as output light per the predetermined pitch d. Preferably, a collimator is further mounted to the end of the vertical section 410 of each optical fiber 400 to make collimated light and thus increase the quantity of light reflected back to the optical fiber.

Here, the larger the difference in transmissivity between the transmissive surface 210 and the non-transmissive surface 220, the smaller the interference signal becomes, and the larger the amplitude of an output signal becomes. As a result, high resolution is obtained. Here, the width d1 of the transmissive surface 210 and the width d2 of the non-transmissive surface 220 should be equal to or less than a diameter of the optical beam irradiated from each optical fiber 400 to attain a periodic signal and enable signal processing. In other words, when using the transmissive grating panel 200 having the width d1 of the transmissive surface 210 and the width d2 of the non-transmissive surface 220 which are equal in dimension to a diameter of an optical beam, the amplitude of the transmitted signal is the highest.

Further, even if the width d1 of the transmissive surface 210 to the width d2 of the non-transmissive surface 220 has a predetermined ratio or the widths d1 and d2 are smaller than the diameter of the optical beam, the signal of the sine wave is generated, but it is preferable to use the transmissive grating panel 200 having the transmissive surface 210 and the non-transmissive surface 220 with the widths d1 and d2 which are 40% or more greater than the diameter of the optical beam for the optical beam having a Gaussian distribution. Here, although the ratio of the width d1 of the transmissive surface 210 to the width d2 of the non-transmissive surface 220 is 0.8 to 1.2, it is possible to obtain the sine wave signal.

In this embodiment, light is irradiated through the vertical section 410 provided on the end of each optical fiber 400 to the transmissive grating panel 200 using a laser diode (LD) or a light emitting diode (LED) as a laser source 420 transmitted through the optical fiber 400. Here, light incident from the transmissive surface 210 that is the transmissive area of the transmissive grating panel 200 strikes and is then reflected from the reflection mirror 300, so that the light is transmitted through the vertical section 410 of the optical fiber 400 to the optical fiber 400. Then, the reflected light proceeds through a different path when it is incident on a circulator 430 or a coupler, and is inputted into a photo detector 440. Thereby, output light can be detected.

Here, even for the same change in displacement, output waveforms having different sensitivities as shown in FIGS. 5A and 5B are outputted depending on the width d1 of the transmissive surface 210, and the ratio of the width d1 of the transmissive surface 210 to the width d2 of the non-transmissive surface 220. In other words, a triangle wave having a constant resolution in any section may be made, as shown in FIG. 5B, a sine wave may be formed as shown in FIG. 5A, and a non-linear function may be formed. If the non-linear function is obtained, it is difficult to predict the displacement based on the received signal.

Thus, when configuring the temperature sensor using the transmissive grating panel 200, it is important to match it with the condition capable of outputting the sine wave, but it is required to design the pattern of the transmissive grating panel 200 in consideration of the sensitivity of the temperature sensor. Meanwhile, in order to increase the response velocity depending on the movement of the transmissive grating panel 200, the width d1 of the transmissive surface 210 and the width d2 of the non-transmissive surface 220 are reduced so that there are many pitches in a moving section. Thus, determination can be able to be made based on the pitch without requiring special signal processing. However, since this method lessens amplitude, it imposes restrictions on a specification (resolution) of the photo detector 440 which performs measurement, when converting the amplitude into the intensity of the voltage and measuring it. On one hand, in the case of precisely measuring a slowly changing displacement, a variable breadth of the quantity of transmitted light should be as large as possible, so that the width d1 of the transmissive surface 210 and the width d2 of the non-transmissive surface 220 should be made relatively large.

Hereinbelow, the configuration of the fiber optic sensor using the transmissive grating panel and the mirror in accordance with this embodiment having the above basic principle will be described in detail.

The fiber optic sensor for measuring the temperature of this embodiment is provided with a pair of bimetal members 100, which are fixed to a fixing member 500 such as a wall surface or an outer wall of the sensor in the form of a cantilever beam. Here, the bimetal members 100 are designed by combining metals which have greatly different thermal expansive coefficients so as to generate a large displacement for temperature. Further, the pair of bimetal members 100 are configured such that two bimetal members 100 have the same mechanical behavioral properties, and thus upper and lower bimetal member 100 have the same displacement at their ends. That is, the pair of bimetal members 100 are equally configured. Further, the pair of bimetal members 100 are mounted to the fixing member 500 such as the wall surface or the outer wall of the sensor so as to have the same displacement directivity.

Meanwhile, the reflection mirror 300 is installed between the pair of bimetal members 100. Preferably, the reflection mirror 300 is mounted to an extension member 510 that extends in a fixed manner from the fixing member 500. That is, preferably, in the state where the extension member 510 extends to be adjacent to the optical fibers 400, the reflection mirror 300 is secured to the fixing member 500, so that a distance between the reflection mirror 300 and each optical fiber 400 is reduced and thus the quantity of reflected light is increased. Here, the reflection mirror 300 should not be movable with respect to the fixing member 500 or the extension member 510, and should be installed to be perpendicular to the opposite optical fiber 400.

Further, the transmissive grating panel 200 is connected to ends of the pair of bimetal members 100 to move together depending on the displacement of the bimetal members 100. Meanwhile, when there is a great temperature rise, the pair of bimetal members 100 and the transmissive grating panel 200 may deviate from verticality by predetermined angles. Therefore, connection portions between the pair of bimetal members 100 and the grating panel 200 preferably ensure flexibility for an angle.

As illustrated in FIG. 3, the transmissive grating panel 200 is in the form of a panel configured so that the transmissive surfaces 210 permitting the transmission of light and the non-transmissive surfaces 210 preventing the transmission of light are repeated at predetermined pitches. Here, each non-transmissive surface 210 serves to guide light reflection in another direction where the optical fiber is not present. Thus, the non-transmissive surface 210 may be made of a reflective substance or an absorptive substance. Further, the grating pitch of the transmissive grating panel 200 is established to obtain a sine wave for the beam width of light irradiated from the optical fibers 400.

Meanwhile, the pair of optical fibers 400 are installed to be opposite to the transmissive grating panel 200 facing the reflection mirror 300. The pair of optical fibers 400 is fixed to the fixing member 500 such as the wall surface or the outer wall of the sensor. Preferably, the pair of optical fibers 400 is fixed to be precisely perpendicular to the reflection mirror 300, thus allowing the quantity of reflected light to be at a maximum. Further, two optical fibers 400 are installed at positions having the phase of 90° ($\pi/2$) relative to the sine wave generated by the transmissive grating panel 200. Further, the transmissive grating panel 200, the reflection mirror 300 and the pair of optical fibers 400 are installed to have spacing distances therebetween so that the diffraction of light does not occur and the signal of the sine wave can be outputted.

Thus, if the temperature change $\Delta T$ occurs, the displacement of $\delta$ is generated by the properties of the bimetal members 100. This displacement leads to vertically move the transmissive grating panel 200 by the same value, $\delta$. Since the reflection mirror 300 and the optical fibers 400 continue to maintain their states regardless of the temperature change, the transmissive grating panel 200 is vertically moved relative to the reflection mirror 300 and the optical fibers 400, and the quantity of light received by the optical fibers 400 repeats the modulated optical signal which may be simply mathematically expressed as a trigonometric function depending on a moving grating distribution. By means of a signal processing process whereby the change in the quantity of light measured in this way is converted into the relative displacement of the grating, the displacement $\delta$ of the grating panel is calculated, and thereby the temperature change $\Delta T$ can be calculated using the equations.

Figure 6:
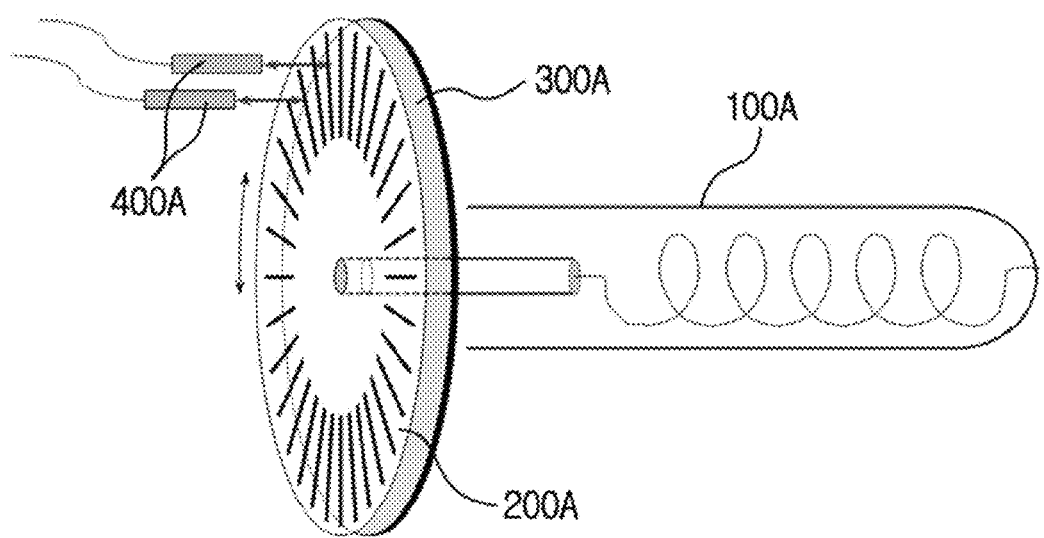
FIG. 6 is a schematic view showing a configuration of a fiber optic sensor for measuring the temperature using a transmissive grating panel and a mirror, in accordance with another embodiment of this invention.

FIG. 6 is a schematic view showing a configuration of a fiber optic sensor for measuring the temperature using a transmissive grating panel and a mirror in accordance with another embodiment of this invention.

As shown in FIG. 6, the fiber optic sensor for measuring the temperature according to this embodiment remains the same as the above-mentioned embodiment, except that a spiral bimetal member 100A is utilized in place of one pair of cantilever-beam type of bimetal members. Thus, components common to both the embodiments will carry the same or similar reference numerals, and a detailed description thereof will be omitted.

The fiber optic sensor for measuring the temperature using the transmissive grating panel and the mirror in accordance with this embodiment measures rotary displacement generated in the bimetal member 100A depending on the temperature change using a transmissive grating panel 200A, a reflection mirror 300A, and optical fibers 400A, and thereafter provides the measured result to a system, thus enabling the temperature to be measured by the system. The transmissive grating panel 200A includes transmissive surfaces and non-transmissive surfaces, which are arranged at predetermined pitches. The reflection mirror 300A reflects light that has passed through the transmissive grating panel 200A. The optical fibers 400A receive light reflected from the reflection mirror 300A. That is, the fiber optic sensor for measuring the temperature according to this embodiment includes the spiral bimetal member 100A. The rotary transmissive grating panel 200A is secured to a spiral end of the spiral bimetal member 100A. The reflection mirror 300A is secured to one side of the transmissive grating panel 200A. The optical fibers 400A are secured to the other side of the transmissive grating panel 200A, and serve to perpendicularly irradiate light to the transmissive grating panel 200A and the reflection mirror 300A and to receive the light reflected from the reflection mirror 300A.

Here, the spiral bimetal member 100A is generally configured so that a bimetal material is provided in spiral form. That is, the fiber optic sensor for measuring the temperature according to this embodiment is configured by applying the above-mentioned basic principle of this invention to a rotary thermometer having the general spiral bimetal member 100A.

Thus, if a temperature change occurs, the spiral bimetal material of the bimetal member 100A rotates, and its rotating force causes the rotary transmissive grating panel 200A having a radial grating pattern to rotate. As the grating panel 200A rotates, a grating portion facing the optical fibers 400A moves along a circumference, so that an overall rotating angle is calculated by measuring the displacement resulting from the circumferential movement. The temperature change $\Delta T$ can be calculated using the rotating angle.

Hereinbefore, the fiber optic sensor for measuring the temperature intended to measure the temperature change in the external environment has been described. However, this invention may be implemented as a fiber optic sensor for measuring displacement, pressure, vibration or acceleration to measure the behavioral change (displacement, pressure, vibration or acceleration, etc.) in the object. That is, response means for responding to the behavioral change in the object is configured to be adapted to a measuring purpose, and the other components remain the same as those of the above-mentioned fiber optic sensor for measuring the temperature, so that it is possible to implement the fiber optic sensor for measuring the displacement, the pressure, the vibration or the acceleration. Thus, only the configuration of the response means for the measuring purpose will be described below in brief, and the description of the remaining components will be omitted.

Figure 7:
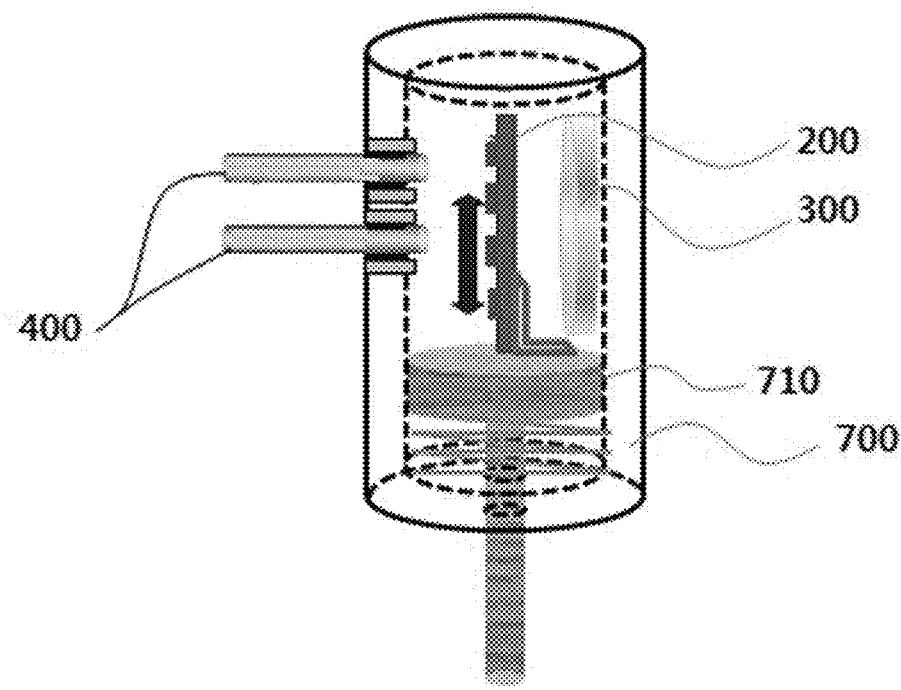
FIGS. 7 to 9 are schematic views showing configurations of fiber optic sensors for measuring displacement, vibration and/or acceleration, and pressure using a transmissive grating panel and a mirror, in accordance with other embodiments of this invention.

FIG. 7 is a schematic view showing a configuration of a fiber optic sensor for measuring displacement using a transmissive grating panel and a mirror in accordance with another embodiment of this invention. As shown in FIG. 7, response means of the fiber optic sensor for measuring the displacement according to this invention is provided with a connection member 710, which is secured at one side thereof to an inner surface (corresponding to the fixing member 500 of FIG. 1) of a casing 700, and is secured at the other side to a side of the transmissive grating panel 200. Here, the connection member 710 has only to connect the transmissive grating panel 200 to the inner surface of the casing 700 in such a way that transmissive surfaces 210 and non-transmissive surfaces 220 of the transmissive grating panel 200 are arranged at predetermined pitches in the moving direction of an object.

Figure 8:
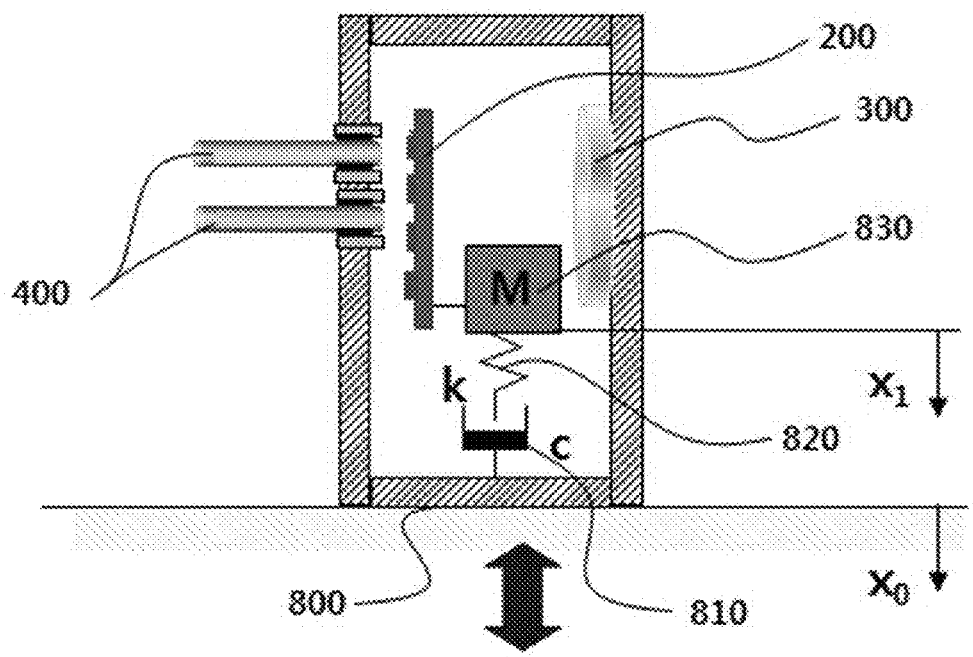

FIG. 8 is a schematic view showing a configuration of a fiber optic sensor for measuring vibration and/or acceleration using a transmissive grating panel and a mirror in accordance with another embodiment of this invention. As shown in FIG. 8, response means of the fiber optic sensor for measuring vibration and/or acceleration according to this invention includes a single attenuator 810 secured to an inner surface (corresponding to the fixing member 500 of FIG. 1) of a casing 800, a single elastomer 820 installed above the single attenuator 810, and a single mass 830 secured at one side thereof to a top of the single elastomer 820 and secured at the other side to a side of the transmissive grating panel 200. Here, the side of the transmissive grating panel 200 has only to be secured to the side of the single mass 830 in such a way that transmissive surfaces 210 and non-transmissive surfaces 220 of the transmissive grating panel 200 are arranged at predetermined pitches in the vibratory and/or acceleration direction of an object.

Figure 9:
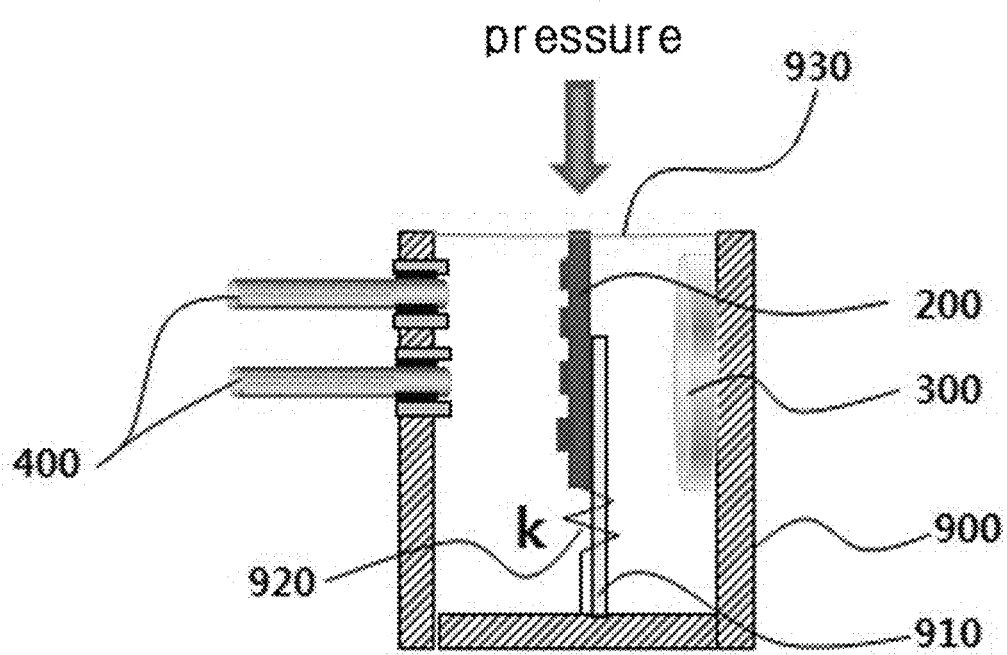

FIG. 9 is a schematic view showing a configuration of a fiber optic sensor for measuring pressure using a transmissive grating panel and a mirror in accordance with another embodiment of this invention. As shown in FIG. 9, response means of the fiber optic sensor for measuring the pressure according to this invention includes a guide bar 910 secured to an inner surface (corresponding to the fixing member 500 of FIG. 1) of a casing 900 and erected in a vertical direction, an elastomer 920 secured to the inner surface of the casing 900 in such a way as to be erected in the vertical direction and mounted to a side of the guide bar 910, with a transmissive grating panel 200 being secured to a top of the elastomer 920, and a pressure applying plate 930 mounted on a top of the transmissive grating panel 200 to apply external pressure to the transmissive grating panel 200. Here, a side of the transmissive grating panel 200 has only to be secured to the top of the elastomer 920 in such a way that transmissive surfaces 210 and non-transmissive surfaces 220 of the transmissive grating panel 200 are arranged at predetermined pitches in a direction of pressure acting on the transmissive grating panel 200.

As described above, although the fiber optic sensor using the transmissive grating panel and the mirror of this invention is described with reference to the accompanying drawings, this is merely illustrative but is not restrictive.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fiber optic sensor using a transmissive grating panel and a mirror, comprising:
   response means for changing displacement in response to a temperature change in an external environment or a behavioral change in an object that is to be measured;

a transmissive grating panel provided on an end of the response means, and including transmissive surfaces and non-transmissive surfaces arranged at predetermined pitches in a grating pattern, each of the transmissive surfaces being made of a transmissive material to form a transmissive area, each of the non-transmissive surfaces being made of a non-transmissive material that is relatively lower in transmissivity than the transmissive surface to form a non-transmissive area;

a reflection mirror positioned on one side of the transmissive grating panel; and a pair of optical fibers positioned on the other side of the transmissive grating panel facing the reflection mirror, an end of each of the optical fibers being perpendicular to a surface of the transmissive grating panel, and the optical fibers being provided, respectively, at predetermined positions and serving as a light irradiating part to irradiate light to the transmissive grating panel and a light receiving part to receive reflective light passing through the transmissive grating panel and subsequently reflected from the reflection mirror, wherein the transmissive grating panel, the reflection mirror and the pair of optical fibers are provided to be spaced apart at distances at which a signal of a sine wave is output, and the pair of optical fibers is provided at positions having a phase of 90° ($\pi/2$) relative to the sine wave.

2. The fiber optic sensor as set forth in claim 1, wherein a width of each of the transmissive surfaces and a width of each of the non-transmissive surfaces are equal to or smaller than a diameter of an optical beam irradiated from the optical fiber.

3. The fiber optic sensor as set forth in claim 2, wherein the non-transmissive surfaces are made of a reflective material or an absorptive material.

4. The fiber optic sensor as set forth in claim 1, further comprising:

a collimator mounted to an end of each of the optical fibers to make collimated light and thus increase a quantity of light transmitted to the optical fiber.

5. The fiber optic sensor as set forth in claim 1, wherein the response means comprises a pair of bimetal members, the bimetal members adapted to be secured at one end thereof to a fixing member in a form of a cantilever beam in such a way as to be spaced apart from each other by a predetermined interval, and being connected at the other end to the transmissive grating panel.

6. The fiber optic sensor as set forth in claim 5, wherein a width of each of the transmissive surfaces and a width of each of the non-transmissive surfaces are equal to or smaller than a diameter of an optical beam irradiated from the optical fiber.

7. The fiber optic sensor as set forth in claim 6, wherein the non-transmissive surfaces are made of a reflective material or an absorptive material.

8. The fiber optic sensor as set forth in claim 5, further comprising:

a collimator mounted to an end of each of the optical fibers to make collimated light and thus increase a quantity of light transmitted to the optical fiber.

9. The fiber optic sensor as set forth in claim 1, wherein the response means comprises a bimetal member made of a spiral bimetal material, the bimetal member adapted to be secured at one end thereof to a fixing member and secured at the other end to the transmissive grating panel.

10. The fiber optic sensor as set forth in claim 9, wherein a width of each of the transmissive surfaces and a width of each of the non-transmissive surfaces are equal to or smaller than a diameter of an optical beam irradiated from the optical fiber.

11. The fiber optic sensor as set forth in claim 10, wherein the non-transmissive surfaces are made of a reflective material or an absorptive material.

12. The fiber optic sensor as set forth in claim 9, further comprising:

a collimator mounted to an end of each of the optical fibers to make collimated light and thus increase a quantity of light transmitted to the optical fiber.

13. The fiber optic sensor as set forth in claim 1, wherein the response means comprises a connection member, the connection member adapted to be secured at one end thereof to a fixing member and secured at the other end to the transmissive grating panel.

14. The fiber optic sensor as set forth in claim 13, wherein a width of each of the transmissive surfaces and a width of each of the non-transmissive surfaces are equal to or smaller than a diameter of an optical beam irradiated from the optical fiber.

15. The fiber optic sensor as set forth in claim 14, wherein the non-transmissive surfaces are made of a reflective material or an absorptive material.

16. The fiber optic sensor as set forth in claim 13, further comprising:

a collimator mounted to an end of each of the optical fibers to make collimated light and thus increase a quantity of light transmitted to the optical fiber.

17. The fiber optic sensor as set forth in claim 1, wherein the response means comprises:

a single attenuator adapted to be secured to a fixing member;

a single elastomer provided above the single attenuator; and a single mass secured at one side thereof to a top of the single elastomer and adapted to be secured at another side thereof to the transmissive grating panel.

18. The fiber optic sensor as set forth in claim 17, wherein a width of each of the transmissive surfaces and a width of each of the non-transmissive surfaces are equal to or smaller than a diameter of an optical beam irradiated from the optical fiber.

19. The fiber optic sensor as set forth in claim 18, wherein the non-transmissive surfaces are made of a reflective material or an absorptive material.

20. The fiber optic sensor as set forth in claim 17, further comprising:

a collimator mounted to an end of each of the optical fibers to make collimated light and thus increase a quantity of light transmitted to the optical fiber.

21. The fiber optic sensor as set forth in claim 1, wherein the response means comprises:

a guide bar adapted to be secured to a fixing member in such a way as to be erected vertically;

an elastomer adapted to be secured to the fixing member in such a way as to be erected vertically, the elastomer being provided on a side of the guide bar, with the transmissive grating panel being secured to a top of the elastomer; and a pressure applying plate provided on a top of the transmissive grating panel to apply external pressure to the transmissive grating panel.

22. The fiber optic sensor as set forth in claim 21, wherein a width of each of the transmissive surfaces and a width of each of the non-transmissive surfaces are equal to or smaller than a diameter of an optical beam irradiated from the optical fiber.

23. The fiber optic sensor as set forth in claim 22, wherein the non-transmissive surfaces are made of a reflective material or an absorptive material.

24. The fiber optic sensor as set forth in claim 21, further comprising:
   a collimator mounted to an end of each of the optical fibers to make collimated light and thus increase a quantity of light transmitted to the optical fiber.

* * * * *